United States Patent [19]
Nash

[11] Patent Number: 5,855,958
[45] Date of Patent: Jan. 5, 1999

[54] METHOD OF MAKING A CONCRETE STEPPING STONE WHOSE UPPER SURFACE REPLICATES GROUTED STONES

[76] Inventor: Lawrence Edward Nash, 1999 46th St. S.W., Naples, Fla. 33999

[21] Appl. No.: 568,787

[22] Filed: Dec. 7, 1995

[51] Int. Cl.⁶ .................. B05D 3/00; B28B 1/08; B28B 11/08; C04B 41/61
[52] U.S. Cl. ............... 427/274; 264/71; 264/74; 264/133; 264/245; 264/256; 264/293; 264/296; 264/300; 427/275; 427/309; 427/393.6
[58] Field of Search ............ 264/71, 233, DIG. 43, 264/133, 74, 245, 256, 293, 296, 300, 338, 336; 427/292, 274, 275, 280, 309, 393.6

[56] References Cited

U.S. PATENT DOCUMENTS

| | | |
|---|---|---|
| 3,012,285 | 12/1961 | Marcus et al. |
| 3,152,002 | 10/1964 | Wisotzky et al. |
| 3,574,801 | 4/1971 | Jauker ............ 264/71 |
| 3,836,619 | 9/1974 | Volent |
| 3,882,218 | 5/1975 | Bixel, Jr. |
| 4,043,826 | 8/1977 | Hum |
| 4,094,941 | 6/1978 | Manners et al. ...... 264/71 |
| 4,105,816 | 8/1978 | Hori |
| 4,126,727 | 11/1978 | Kaminski |
| 4,271,111 | 6/1981 | Sheber ............. 264/71 |
| 4,310,370 | 1/1982 | Aria et al. |
| 4,349,588 | 9/1982 | Schiffer |
| 5,372,676 | 12/1994 | Lowe |
| 5,441,677 | 8/1995 | Phillips, Sr. ...... 264/DIG. 43 |

FOREIGN PATENT DOCUMENTS

| | | |
|---|---|---|
| 1180019 | 2/1970 | United Kingdom ......... 264/71 |
| 85/03433 | 6/1986 | WIPO |

*Primary Examiner*—Karen Aftergut
*Attorney, Agent, or Firm*—Merrill N. Johnson

[57] ABSTRACT

A method of making a cast concrete stepping stone whose exposed upper surface has the appearance of two or more grouted attractive natural stepping stones. A liquid release agent is applied to the mold which is then placed on a vibrator table and filled with wet concrete. The mold is vibrated for about 30 seconds and the surface of the concrete troweled smooth. Dry body color is sprinkled over the concrete surface and troweled to completely cover the concrete. A dry release agent containing powdered color having a darker shade than the body color is sprinkled over the dry body color covering the concrete. The desired pattern is then pressed into the surface of the concrete and after a six hour drying time, the cast stepping stone is removed from the mold. Excess body color and release agent are washed away and the washed surfaces totally dried. Finally a clear concrete sealer is applied to the exposed upper surface of the concrete stepping stone.

1 Claim, 1 Drawing Sheet

METHOD OF MAKING A CONCRETE STEPPING STONE WHOSE UPPER SURFACE REPLICATES GROUTED STONES

FIELD OF THE INVENTION

My invention lies in the field of cast concrete products and more particularly in the manufacture of concrete panels whose upper surfaces replicate natural stone, marble, ceramic tile or brick.

BACKGROUND OF THE INVENTION

The high cost of attractive natural stone, marble, ceramic tile and genuine brick in recent years has turned designers, builders and home owners to the use of relatively inexpensive cast concrete products to replace products made essentially of genuine natural stone, marble, tile or brick.

However, unless the exposed surfaces of the cast concrete product faithfully replicate the shape and color of the original natural product, the cast concrete product would not be acceptable to the trade despite its price advantage.

This has led to numerous suggestions for forming and/or treating the exposed surface of the cast concrete product in an attempt to replicate the shape and color of the original natural product. Accordingly, the prior art is replete with suggestions for making the exposed surfaces of a cast concrete product look like an arrangement of bricks or stones or marble or ceramic tiles. See, for example, Lowe U.S. Pat. No. 5,372,676 and the earlier patents named and discussed in Lowe '676.

SUMMARY OF THE INVENTION

Briefly put, I have invented a method which simply and economically makes a durable cast concrete stepping stone whose upper surface appears to be two or more stones grouted together to form an attractive stepping stone.

The resulting stepping stone has a shaded, two tone appearance which can be done in varying shades of grey, brown, green or one of the three primary colors. Likewise, the shape and size of the two or more stones can be easily varied to create a stepping stone pleasing to those persons who will use it.

My method starts with a mold which can have any desired outer configuration, i.e., circular, oval, rectangular or square. Similarly, the size of the molded stepping stone can be varied by changing the overall length of the sides of the mold. The side of the mold is preferably a continuous two inch wide strip of polyvinyl chloride (PVC) tape resting edgewise on a horizontal flat wooden or metal panel which forms the bottom of the mold. The abutting ends of the PVC tape are releasably held together to permit easy removal of the mold from the cast stepping stone after its concrete has hardened.

The steps of my method of making a concrete stepping stone whose upper surface looks like two or more attractive natural stones grouted together are as follows:

1. Apply wax or other release agent to the inside surfaces of the mold to prevent the dried concrete stepping stone from adhering to the mold.
2. Place mold on vibrator table, fill mold with wet concrete and trowel top of concrete smooth.
3. Vibrate the filled mold for about 30 seconds to compact the concrete.
4. Sprinkle dry body color over the upper surface of the wet concrete and lightly trowel until the body color completely covers the concrete with a smooth consistent color. The body color consists of 90% silica sand, 5% of a binding agent such as titanium dioxide and 5% powdered color.
5. Sprinkle dry colored release agent over the surface of body color covering the wet concrete. The colored release agent consists of 95% powdered silicone and 5% powdered color, same color as the body color but a darker shade to give a two-tone effect to the finished product.
6. Gently press a desired pattern into the semi-wet concrete mixture using a well known rubberized form to effect the desired stone surface impressions and grouted joints.
7. Remove cast stepping stone from the mold after a drying time of about six hours.
8. Remove excess body color and release agent using water and a brush and let the washed surface become totally dry.
9. Brush, spray or roll a clear concrete sealer such as an epoxy onto the upper surface of the cast stepping stone.

The resulting product is an economical durable stepping stone whose upper surface has the appearance of two or more grouted attractive natural stepping stones.

DETAILED DESCRIPTION OF A PREFERRED EMBODIMENT

Figure 1:
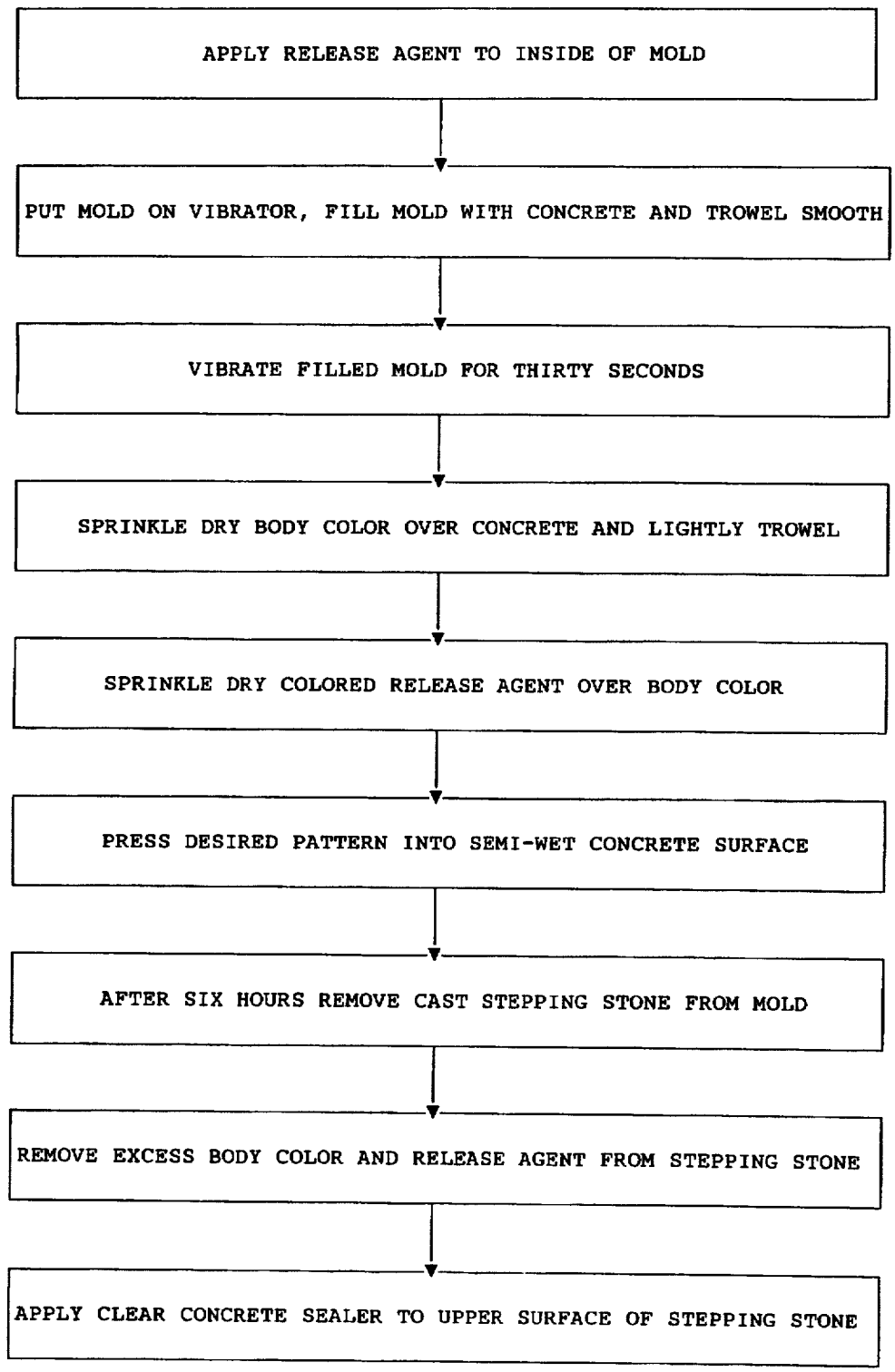
FIG. 1 is a flow chart of my method of making a cast concrete stepping stone which has the appearance of a plurality of grouted natural stepping stones.

Before making stepping stones according to my invention, it is necessary that the person making the stones has readily available sufficient quantities of the following items.

First, a sufficient quantity of body color made by mixing together dry silica sand, a binding agent such as titanium dioxide, and a desired powdered color. The resulting mixture should contain by volume about 90% sand, about 5% binder and 5% powdered color.

Secondly, a sufficient quantity of colored release agent made by mixing together powdered silicone and a powdered color having the same color as that used in the body color but a darker shade. The resulting mixture should contain by volume about 95% powdered silicone and about 5% powdered color.

Finally, there should be on hand a quantity of molds to receive and form wet concrete into a panel. The preferred embodiment of my method of making stepping stones results in stepping stones with a diameter of 13 inches and a thickness of two inches.

The molds for making these stepping stones preferably consist of a horizontal wooden or metal plate measuring at least fifteen inches in length and width and a two inch wide section of 14 inch outside diameter PVC pipe. The two inch section of PVC pipe is laid edgewise in the center of the horizontal plate so the pipe section forms the side wall of the mold and the plate is the bottom of the mold. In order to facilitate removal of the cured concrete panel from the mold, the PVC pipe section is split axially and the abutting ends releasably held together until the wet concrete has cured.

With the foregoing items on hand and with reference to FIG. 1 of the drawing, my method of making a concrete stepping stone whose upper surface replicates a plurality of adjacent natural stepping stones separated by group consists of the following steps:

1. Apply a release agent such as liquid wax to the inside surfaces of the mold to prevent the dried concrete stepping stone from adhering to the mold.
2. Place mold on a vibrator table, fill the mold with wet concrete and trowel the upper surface of the wet concrete smooth.
3. Vibrate the filled mold for about 30 seconds in order to compact the wet concrete.
4. Sprinkle a sufficient quantity of dry body color over the upper surface of the wet concrete and lightly trowel the surface until the body color completely covers the concrete with a smooth consistent color.
5. Sprinkle a quantity of dry colored release agent over the surface of the body color covering the wet concrete. The colored release agent has the same color as the body color but a darker shade to give a two-tone effect to the finished stepping stone.
6. Gently press a desired pattern into the semi-wet concrete mixture using a rubberized form to effect the desired stone surface impressions and grouted joints.
7. After a drying time of about six hours, remove the cast stepping stone from the mold.
8. Remove the loose body color and release agent from the cast stepping stone preferably by using water and a soft brush and let the washed surface become totally dry.
9. Apply a clear coating of concrete sealer such as an epoxy over the entire upper surface of the cast stepping stone.

The foregoing steps of my method will provide a low cost durable stepping stone whose exposed upper surface has the appearance of two or more grouted attractive natural stepping stones.

While I have described and illustrated a preferred form of my method of making a stepping stone, no limitation of the scope or extent of my invention should be inferred from the foregoing description. The scope of my invention is set forth only in the following claim.

I claim:

1. A method of making a cast concrete stepping stone whose upper surface replicates a plurality of grouted together natural stones in which the casting is done in an open-topped mold having a flat bottom surface and a continuous sidewall made from a strip of polyvinyl chloride lying edgewise on the mold's flat bottom surface with its opposite ends releasably held together during casting comprising:

first apply a liquid release agent to the inside of the mold, place the mold on a vibrator table, fill the mold with wet concrete and trowel an upper surface of the wet concrete smooth, sprinkle dry body color consisting of 90% silica sand, 5% titanium dioxide binding agent and 5% powdered color over the upper surface of the concrete and lightly trowel until body color completely covers the concrete with a smooth consistant color, sprinkle dry colored release agent consisting of 95% powdered silicone and 5% powdered color having the same color as the body powdered color but a darker shade over the body color on the upper surface of the cast concrete, press a desired pattern into the surface of the semi-wet concrete, after six hours drying time, remove the cast concrete stepping stone from the mold, remove excess body color and release agent from the stepping stone using water and let the washed upper surface become totally dry, and then apply clear concrete sealer to the upper surface of the cast concrete stepping stone.

* * * * *